United States Patent [19]

Latva-aho et al.

[11] Patent Number: 5,654,980
[45] Date of Patent: Aug. 5, 1997

[54] METHOD FOR CONTROLLING A RECEIVER, AND A RECEIVER

[75] Inventors: Matti Latva-aho; Pertti Brockman, both of Oulu, Finland

[73] Assignee: Nokia Mobile Phones Ltd., Salo, Finland

[21] Appl. No.: 497,552

[22] Filed: Jun. 30, 1995

[30] Foreign Application Priority Data

Jul. 7, 1994 [FI] Finland ............................. 943249

[51] Int. Cl.⁶ ........................... H04J 13/02; H04B 17/02
[52] U.S. Cl. ................. 375/208; 375/367; 375/347; 455/137
[58] Field of Search ........................ 375/200, 201, 375/202, 205, 206, 354, 347, 349, 364, 365, 366, 368, 367; 455/101, 132, 133, 137, 140, 134, 135

[56] References Cited

U.S. PATENT DOCUMENTS 5,212,691 5/1993 Kaufmann ............................. 375/1
5,317,595 5/1994 Ostman ................................ 375/14
5,396,657 3/1995 Jokinen .............................. 455/305

FOREIGN PATENT DOCUMENTS

WO 93/19552 9/1993 WIPO .

OTHER PUBLICATIONS

Finnish Office Action dated Mar. 30, 1995 on priority Finnish Patent Application No. 943249 and english translation thereof.

*Primary Examiner*—Stephen Chin
*Assistant Examiner*—Kevin Kim
*Attorney, Agent, or Firm*—Perman & Green

[57] ABSTRACT

A receiver and a method for controlling a receiver, the receiver being implemented on the RAKE principle and comprising a number of correlators (30a–30d) which are able to synchronize with a received signal. To effectively utilize the correlators of the receiver, the operation made of the correlators in the receiver is changed dynamically in the method of the invention between the received signal tracking and acquisition modes according to the need.

15 Claims, 3 Drawing Sheets

METHOD FOR CONTROLLING A RECEIVER, AND A RECEIVER

BACKGROUND OF THE INVENTION

The invention relates to a method for controlling a receiver that is implemented on the RAKE principle and comprises a number of correlators which are able to synchronize with a received signal.

A receiver operating on the RAKE principle comprises several branches, and each branch can synchronize with a different signal component. The receiver can thus receive a plurality of signals simultaneously. RAKE receivers are used especially in CDMA receivers.

CDMA is a multiple access system based on a spread spectrum technique, and it has recently been put into use in cellular radio systems in addition to previously used FDMA and TDMA. CDMA has many advantages over the prior methods, such as simplicity of frequency planning, and spectrum efficiency.

In a CDMA method, a narrow-band data signal of a user is multiplied to a relatively broad band by a spreading code having a much broader band than the data signal. Band widths used in known test systems include e.g. 1.25 MHz, 10 MHz and 25 MHz. The multiplication spreads the data signal over the entire band to be used. All the users transmit simultaneously on the same frequency band. On each connection between a base station and a mobile station is used a different spreading code, and the signals of the users can be distinguished from one another in the receivers on the basis of the spreading code of the user. If possible, the spreading codes are selected in such a way that they are mutually orthogonal, i.e. they do not correlate with one another.

Correlators in conventionally implemented CDMA receivers are synchronized with a desired signal, which they recognize on the basis of the spreading code. In the receiver the data signal is restored to the original band by multiplying it by the same spreading code as in the transmission step. Ideally, the signals that have been multiplied by some other spreading code do not correlate and are not restored to the narrow band. In view of the desired signal, they thus appear as noise. The object is to detect the signal of the desired user from among a number of interfering signals. In practice, the spreading codes correlate, and the signals of the other users make it more difficult to detect the desired signal by distorting the received signal non-linearly. This interference caused by the other users is called multiple access interference.

It is vital to the performance of the spread spectrum system that the receiver is able to synchronize with an incoming signal quickly and accurately. The synchronization with the incoming signal usually takes place in two steps. In code phase acquisition, the aim is to find the desired signal in the input and determine its phase with the accuracy of half a chip. When this has been accomplished, the phase is considered locked, and the code phase is then fine-adjusted with a code tracking loop, which maintains the phase lock.

The code phase acquisition can be implemented on either the applied filter or active correlation principle. The former method is rapid, but it can be utilized only with short codes and, when implemented digitally, it requires much current. Active correlation is the most generally used method in CDMA systems. In active correlation, the code phases of a local correlator are monitored at half-a-chip intervals and compared with the received signal. This is economical, but slow. The acquisition can be speeded by using several correlators in parallel, whereby the acquisition area can be divided into sections. The acquisition time is then naturally shortened.

In earlier solutions, RAKE receivers are designed such that the RAKE branches have fixed modes of operation. An acquisition branch looks for signals addressed to the receiver, and separate correlators are reserved for tracking and demodulation of the found signals. Another known solution is that all correlators are used for acquisition in establishing a connection with the system, but when the desired signal has been found, the correlators have fixed modes of operation, i.e. one or two branches are used in the acquisition and the others in the tracking of the desired signal.

In known solutions, the operation of the RAKE branches is not adaptive but either fixed or predetermined. The present receivers are designed to operate primarily in macro cells, i.e. large cells, in which the propagation delays of multipath-propagated signals are long and several tracking correlators are needed. In macro cells, there is time to look for a new base station signal, since the cells are large and a need for changeover does not arise unexpectedly. Micro cells, on the other hand, are small, often less than 500 m. A transmitter and a receiver often have a line of sight, and so the main part of the energy of the signal is contained in the direct propagated component. There is often no need to track several multipath-propagated components. In the solutions of the prior art, the tracking correlators of the receivers are thus not in use.

SUMMARY OF THE INVENTION

This is achieved in one aspect with the method described in the introduction, the method being characterized in that the operation mode to the correlators in the receiver is changed dynamically between the received signal tracking and acquisition modes according to the need.

The invention also relates in another aspect to a receiver that is implemented on the RAKE principle and comprises a number of correlators which are able to synchronize with a received signal. The receiver according to the invention is characterized by comprising means for dynamically changing the operation mode of the correlators in the receiver between the received signal tracking and acquisition modes according to the need.

The above aspects of the present invention provide a receiver whose correlators can be used effectively in different kinds of cells and propagation conditions while the number of correlators is minimized.

The criterion for selecting the acquisition algorithm is usually the synchronization rate. The active correlator acquisition rate is affected especially by the number of correlators available: with a plurality of correlators, the acquisition area can be divided into sections and the acquisition time can thus be shortened. All extra correlators naturally require space in the receiver, so their number must be minimized. In the method of the invention, correlators are used dynamically, whereby no extra correlators are needed but all the correlators of the receiver can be utilized effectively in different kinds of cells and propagation conditions.

Especially in small cells the propagation conditions in an urban environment may change suddenly e.g. at a street corner. Immediately after the corner the base station signal is attenuated by 20 dB, and within the next ten meters, by another 10 dB. A quick changeover to a new base station is then needed before the connection is broken. In the method of the invention, a new base station signal is detected quickly since several correlaters are available for acquisition. In macro cells, on the other hand, it is unnecessary to have several acquisition means available continuously, since the propagation conditions change more slowly. Dynamic use of correlators thus makes it possible to optimize the use and minimize the number of correlators.

BRIEF DESCRIPTION OF THE DRAWINGS

In the following an embodiment of the invention will be described in greater detail with reference to the examples illustrated by the attached drawings, wherein.

DETAILED DESCRIPTION OF THE PREFERRED EMBODIMENT

Figure 1A:
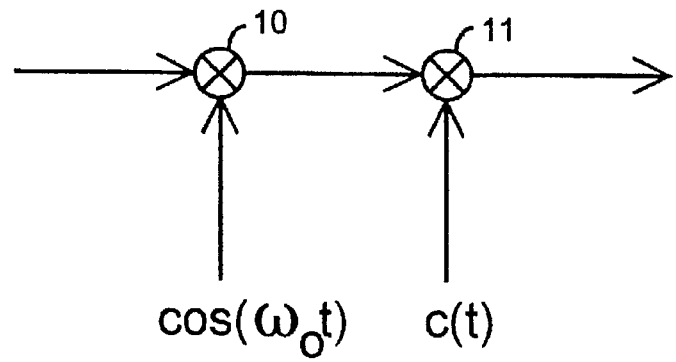
FIG. 1a shows a scheme illustrating the operation of a transmitter of a spread spectrum system.
Figure 1B:
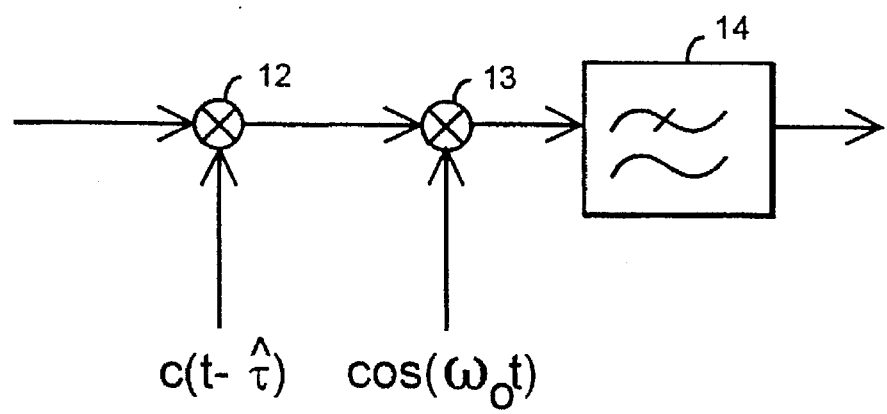
FIG. 1b shows a scheme illustrating the operation of a receiver of a spread spectrum system.

FIG. 1a shows a scheme illustrating the operation of a typical transmitter of a spread spectrum system using BPSK modulation, and FIG. 1b shows a scheme illustrating the operation of a corresponding receiver. A data modulation signal is multiplied in a multiplier 10 by carrier $\cos(\omega_o t)$. Let the bit (chip) duration of the spreading cede be $T_c$. When the signal is multiplied in a multiplier 11 by spreading code G(t), which has a much higher frequency than the information signal, the spectrum of the signal to be transmitted spreads over band $1/T_c$. In the channel the signal is delayed, so the received signal is of the form $$a(k)*c(t-\tau)\cos(\omega_o t),$$

wherein $a(k)$=binary data (±1)

$c(t)$=time-continuous spreading code $\omega_o$=angle frequency of carrier $\tau$=propagation delay.

The receiver comprises two multipliers 12 and 13 and a filter 14. In order that it might be possible to reassemble the received signal as a narrowband signal, the receiver must thus have the same spreading code as the transmitter, and the code must also be cophasal. During the reception, the function is thus to estimate the propagation delay $\tau$. The information signal is obtained by multiplying the received signal by a punctual spreading code in accordance with the formula $$a(k)*c(t-\tau)c(t-\tau')\cos(\omega_o t),$$

wherein $\tau'$=estimate of propagation delay.

If the spreading code generated by the receiver is punctual, the assembled signal is $a(k)\cos(\omega_o t)$, which is the same as the original carrier- and data-modulated signal. If the phase of the spreading code generated in the receiver differs e.g. by 0.5 chips, the performance of the receiver when BPSK is used is impaired by 6 dB. It is thus essential that the phase is detected quickly and accurately.

Figure 2A:
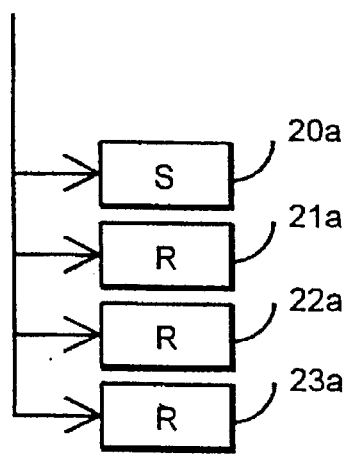
FIGS. 2a and 2b illustrate the method according to the invention.
Figure 2B:
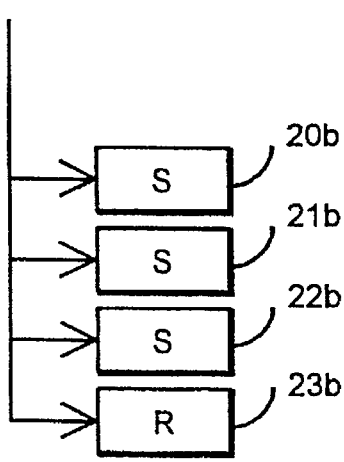

The basic idea of the method according to the invention is described in FIGS. 2a and 2b. The FIGS. show a 4-branch RAKE receiver. In FIG. 2a, one branch 20a of the receiver functions as an acquisition branch and other branches 21a–23a as receiver branches, each receiver branch tracking and demodulating a different multipath-propagated signal component. Advantageously, these components can be combined in the receiver, whereby diversity gain is achieved. This is the normal situation in a macro cell environment. Not all the branches can be assigned as receiver branches, since the receiver must always have at least one acquisition branch measuring impulse response and monitoring transmissions and possible multipath-propagated signal components from the neighbouring base stations.

FIG. 2b illustrates a situation where there are no multipath-propagated components, or they cannot be detected, whereby some of the receiver branches in a conventional RAKE receiver are not in use. In the method of the invention, these free correlators can be utilized effectively by using them for acquisition. In FIG. 2b, correlator branches 20b–22b are assigned to function as acquisition branches, and branch 23b functions as a receiver branch that tracks and demodulates the received signal component.

Figure 3:
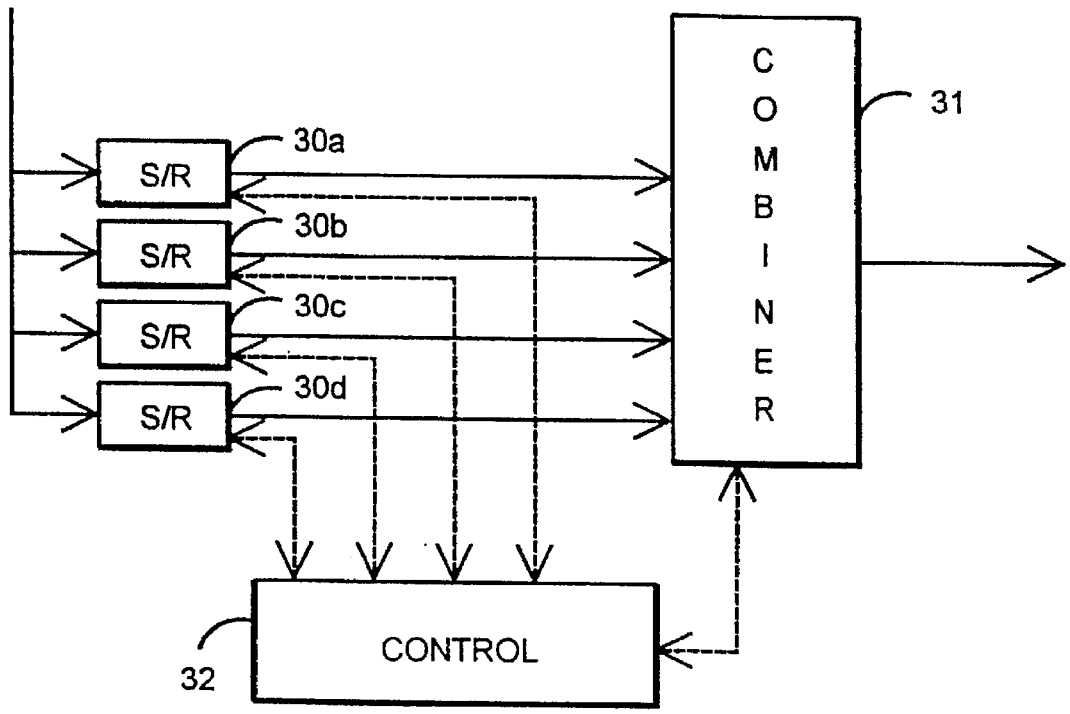
FIGS. 3 and 4 show a block diagram of the structure of a RAKE receiver according to the invention.

FIG. 3 is a block diagram showing part of the structure of a RAKE receiver according to the invention. In the example, the receiver comprises four correlator branches 30a–30b, a diversity combiner 31, which advantageously combines the signals demodulated from different receiver branches, and control logic 32. The control logic 32 controls the branches and the diversity combiner. In the example, all the branches of the receiver can function as either acquisition or receiver branches. It is also possible to design a receiver in which some of the branches are permanently assigned as acquisition or receiver branches, while others have two functions.

The control logic knows the activity of and signal received by each branch. In a macro cell, One of the branches, e.g. 30a, typically functions as an acquisition branch and measures impulse response, whose peaks indicate different multipath signal components with which the other branches can synchronize under control of the logic 32. If the impulse response changes such that the number of peaks, i.e. detectable signal components, is reduced and the signal received by one of the receiver branches is attenuated so that it is no longer worth tracking, the control logic may assign the now free branch, e.g. branch 30d, as an acquisition branch. The control logic phases the acquisition branches 30a and 30d such that the time needed for measuring the impulse response can be minimized.

When an acquisition branch has found a signal component at either the current or a new base station, the logic 32 may assign a receiver branch to synchronize with the signal concerned. The logic may also assign the acquisition branch that detected the signal to receive and demodulate the signal component concerned.

Figure 4:
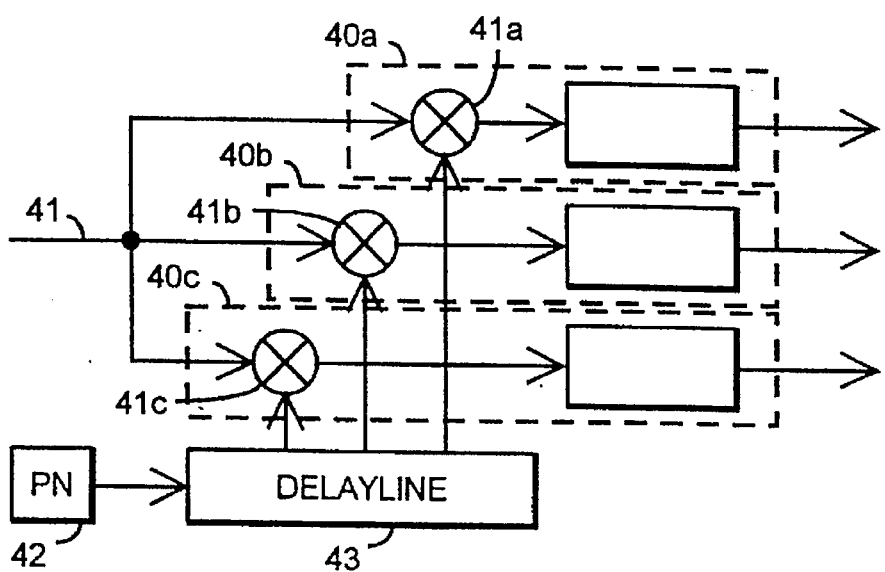

FIG. 4 illustrates the phasing of a plurality of acquisition branches such that the time needed for measuring the impulse response can be minimized. FIG. 4 shows a RAKE receiver in which three branches 40a–40c are assigned as acquisition branches. The branches receive an input of a received signal 41. The receiver also comprises means 42 for generating a spreading code characteristic of the connection. The spreading code is supplied to a delay line 43, from which it is supplied, delayed, to correlators in such a way that each correlator receives a spreading code delayed in a different manner. In each correlator the received signal is multiplied by a spreading code having a different phase. The code space can thus be monitored three times as quickly as by using one correlator.

Figure 5:
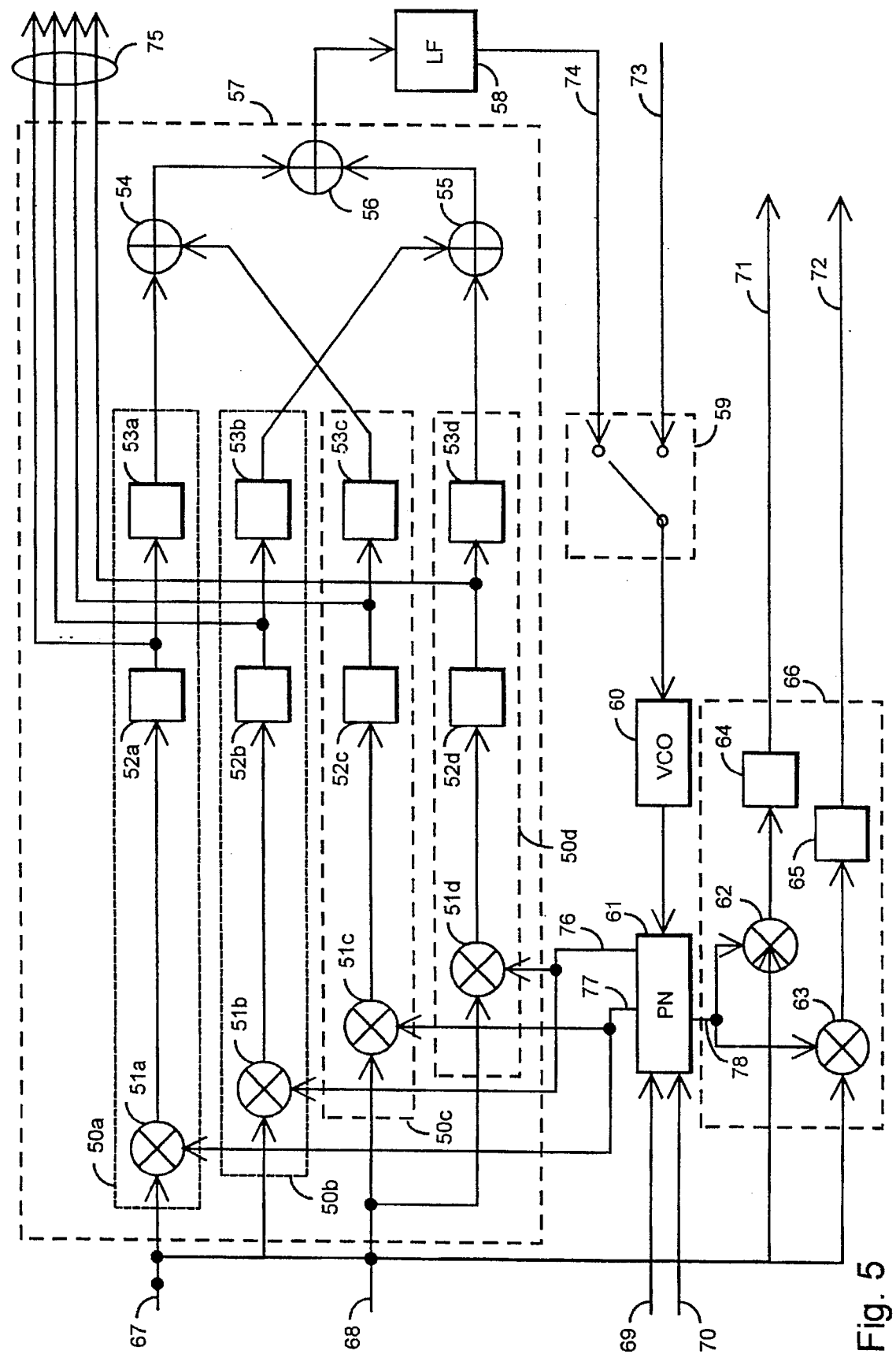
FIG. 5 shows one possible structure of a RAKE branch according to the invention.

FIG. 5 shows in greater detail the structure of one RAKE branch of a receiver according to the invention when BPSK modulation and a conventional early/late code tracking loop are used. The FIG. shows only those parts of the RAKE branch which are essential to acquisition and tracking of code synchronization and to the assembly of a spectrum. The branch also comprises other blocks, such as estimation of a complex multiplier for a multipath-propagated signal, but they are not shown in the figure, since they are not essential to the present invention.

A RAKE branch may comprise several correlators; in a conventional receiver branch, some of these are used for tracking a code and others for assembling a signal. The RAKE branch of FIG. 5 comprises six correlators, four of which are located in a code tracking block 57 and two in signal assembly block 66. In addition to correlators, the branch also comprises a spread spectrum generator 61, a voltage-controlled oscillator 60, and a loop filter 58.

When the branch is used as a receiver branch, the input of the code tracking block comprises real and imaginary components 67 and 68 of the received signal, and both late and early code phases 76 and 77 from the code generator 61. Each correlator 50a–50d comprises multipliers 51a–51d in which the received signal is multiplied by a signal obtained from the code generator, filters 52a –52d and squaring means 53a–53d. The correlated I and Q signals are added in adders 54 and 55 respectively, and the signal obtained is added in adder 56; the signal obtained is then filtered in a loop filter 58 and supplied further to control the voltage-controlled oscillator 60, which controls the code generator 61.

A signal is assembled using a punctual code 78 obtained from the code generator 61, the code being supplied to multipliers 62 and 63, in which the real and imaginary components 67 and 68 of the received signal are multiplied. The assembled signal is obtained at outputs 71 and 72 of filters 64 and 65.

When a RAKE branch is used for acquisition, there are six correlators available. In the acquisition mode, the code generator 61 is controlled by two control outputs 69 and 70, one of which is used for modifying the code phase and the other for modifying the early/late difference. When the branch is used as a receiver branch, the phase difference between the early and late signals is usually one chip, i.e. the punctual early/late difference is half a chip. In acquisition, however, the punctual early/late difference needed is one chip, and so the difference between the early and late signals is 2 chips. In one correlation round, it is thus possible to compute three correlations at 1-chip intervals in each RAKE branch. In the next correlation round, the phase of the code generator has to be shifted by three chips, after which correlations are computed for the phase-shifted code. In the acquisition mode, the voltage-controlled oscillator 60 can be controlled by means of a signal 73 by setting the clock frequency of the local code generator 61 incorrectly on purpose. The acquisition can then be carried out on a so-called sliding correlation principle. In sliding correlation, all code phases are monitored by sliding the phase of the code generator 61. A switch 59 and the entire branch can be controlled by the control unit 32, as shown in FIG. 3. In the acquisition mode, outputs 75 of the correlators 50a–50d of the tracking block 57 are found between the filters 52a–52d and the squaring means 53a–53d.

The RAKE branch shown in FIG. 5 can be easily implemented by using in the receiver e.g. a signal processing processor that is responsible for the acquisition and tracking mode controls 69 and 70 of the code generator.

Although the invention is described above with reference to the example illustrated by the attached drawings, it is to be understood that the invention is not limited thereto but can be modified in many ways within the inventive idea disclosed in the attached claims.

We claim:

1. A method for controlling a receiver that is implemented on a RAKE principle and comprises a number of correlators which are able to synchronize with a received signal, comprising the steps of:

receiving a signal with the receiver; and dynamically changing an operation of individual ones of the correlators in the receiver between a received signal tracking mode and an acquisition mode according to need, wherein at least one of the correlators operates in the acquisition mode at least during a time when at least another one of the correlators operates in the tracking mode.

2. The method according to claim 1, wherein the step of dynamically changing the operation mode of the individual ones of the correlators in the receiver is performed on the basis of an impulse response of the received signal.

3. The method according to claim 1, wherein the step of dynamically changing operates to dynamically change an operation of receiver branches implemented by correlators in the receiver between the received signal tracking and acquisition modes.

4. The method according to claim 1, wherein the correlators used for acquisition are phased such that, when operating in the acquisition mode, each correlator used looks for signals with a different phase.

5. A receiver that is implemented on a RAKE principle and comprises a number of correlators which are able to synchronize with a received signal, and means for dynamically changing an operation of the correlators in the receiver between a received signal tracking mode and an acquisition mode according to need, wherein at least one of the correlators operates in the acquisition mode at least during a time when at least another one of the correlators operates in the tracking mode.

6. The receiver according to claim 5, further comprising a number of receiver branches implemented by correlators, and means for dynamically changing the operation of the receiver branches between the received signal tracking and acquisition modes.

7. The receiver according to claim 5, further comprising means for phasing the correlators used for acquisition in such a way that each correlator looks for signals with a different phase.

8. A RAKE receiver having correlating means for synchronizing with at least one of a plurality of components of a received signal, said correlating means comprising:

a control circuit;

a plurality of correlating branches, individual ones of the plurality of correlating branches having an input coupled to said received signal, at least one of said plurality of correlating branches being dynamically controllable by said control circuit for operating in one of an acquisition mode and a tracking mode, at least one of said plurality of correlating branches operates in the acquisition mode at least during a time when at least another one of the correlating branches operates in the tracking mode; and means for combining signals output from individual ones of the correlating branches operating in the tracking mode, and for supplying a resultant combination signal to an output node.

9. A RAKE receiver as set forth in claim 8, wherein individual ones of said plurality of correlating branches that are operating in said acquisition mode measure at least an impulse response having peaks indicating the received signal components, and wherein individual ones of said plurality of correlating branches that are operating in said tracking mode are controlled by said control circuit to synchronize with respective individual ones of the received signal components.

10. A RAKE receiver as set forth in claim 8, wherein said control circuit controls at least an individual one of said correlating branches to operate in said acquisition mode for detecting a signal, and wherein after a signal is detected by said correlating branch, said control circuit controls said correlating branch to at least receive and demodulate the signal detected.

11. A RAKE receiver as set forth in claim 9, wherein said control circuit uniquely phases individual ones of said plurality of correlating branches operating in said acquisition mode in order to minimize a time taken to measure the impulse response.

12. A RAKE receiver as set forth in claim 8, wherein each correlating branch comprises at least a tracking block and an assembly block.

13. A RAKE receiver as set forth in claim 12, wherein said tracking block comprises:
a plurality of correlators; individual ones of said plurality of correlators comprising:
an input for receiving a respective component of a received signal;
means for multiplying said component with a spread spectrum signal generated by a local generator, and for outputting a resultant multiplication signal;
means for squaring a resultant multiplication signal output by said multiplying means and for providing a squared signal to an output of said correlator.

14. A RAKE receiver as set forth in claim 12, wherein said assembly block comprises:
a plurality of correlators for multiplying respective ones of a real component and an imaginary component of a received signal with a code generated by a local code generator, and for supplying respective resultant assembled signals to respective outputs.

15. A RAKE receiver as set forth in claim 8, wherein said acquisition mode is carried out based on a sliding correlation principle.

* * * * *